(12) United States Patent
Takama et al.

(10) Patent No.: US 9,154,765 B2
(45) Date of Patent: Oct. 6, 2015

(54) IMAGE PROCESSING DEVICE AND METHOD, AND STEREOSCOPIC IMAGE DISPLAY DEVICE

(75) Inventors: Daisuke Takama, Kanagawa (JP); Ryoichi Tsuzaki, Kanagawa (JP)

(73) Assignee: Japan Display Inc., Tokyo (JP)

( * ) Notice: Subject to any disclaimer, the term of this patent is extended or adjusted under 35 U.S.C. 154(b) by 758 days.

(21) Appl. No.: 13/228,733

(22) Filed: Sep. 9, 2011

(65) Prior Publication Data

US 2012/0069004 A1 Mar. 22, 2012

(30) Foreign Application Priority Data

Sep. 16, 2010 (JP) ................................. 2010-208181

(51) Int. Cl.
*H04N 13/00* (2006.01)
(52) U.S. Cl.
CPC ....... *H04N 13/0022* (2013.01); *H04N 13/0018* (2013.01)
(58) Field of Classification Search
CPC .......... H04N 13/0022; H04N 13/0404; H04N 13/0409; H04N 2013/0081; H04N 13/0271; G06T 7/0075; G06T 2207/10012; G06T 2207/20228; A61B 1/00193; A61B 6/022
USPC ................................................ 348/42, 51–59
See application file for complete search history.

(56) References Cited

U.S. PATENT DOCUMENTS

| | | | |
|---|---|---|---|
| 6,031,565 A * | 2/2000 | Getty et al. ...................... 348/56 |
| 2003/0060679 A1* | 3/2003 | Murata et al. ................. 600/111 |
| 2003/0083551 A1 | 5/2003 | Takahashi | |
| 2006/0018509 A1* | 1/2006 | Miyoshi et al. ............... 382/104 |
| 2006/0050338 A1* | 3/2006 | Hattori .............................. 359/9 |
| 2006/0203085 A1* | 9/2006 | Tomita ............................ 348/51 |
| 2009/0244269 A1 | 10/2009 | Watanabe et al. | |
| 2010/0118127 A1* | 5/2010 | Nam et al. ....................... 348/51 |
| 2011/0032341 A1* | 2/2011 | Ignatov et al. .................. 348/51 |
| 2011/0050864 A1* | 3/2011 | Bond .............................. 348/51 |
| 2011/0181593 A1* | 7/2011 | Hirai et al. .................... 345/427 |

(Continued)

FOREIGN PATENT DOCUMENTS

| | | |
|---|---|---|
| JP | 07-200870 A | 8/1995 |
| JP | 10-191397 A | 7/1998 |

(Continued)

OTHER PUBLICATIONS

Okutomi et al., The stereo matching method by an adaptive window. Institute of Electronics Information and Communication Engineers (IEICE). 1991 D-II vol. J74-D-II No. 6 pp. 669-677.

(Continued)

*Primary Examiner* — Sath V Perungavoor
*Assistant Examiner* — Nathnael Aynalem
(74) *Attorney, Agent, or Firm* — Wolf, Greenfield & Sacks, P.C.

(57) ABSTRACT

A method, computer readable medium and apparatus that can produce a depth image based on a first image of a scene from a first viewpoint and a second image of the scene from a second viewpoint. The first and second viewpoints are displaced along a first dimension. A third image and a fourth image are produced based on the depth image. The third and fourth images correspond to third and fourth viewpoints, respectively. The third and fourth viewpoints are displaced along a second dimension different from the first dimension.

5 Claims, 16 Drawing Sheets

(56) References Cited

U.S. PATENT DOCUMENTS

2011/0249889 A1* 10/2011 Kothandaraman et al. ... 382/154
2011/0304714 A1* 12/2011 Akifusa et al. .................. 348/54

FOREIGN PATENT DOCUMENTS

| JP | 2003-222804 A | 8/2003 |
| JP | 2009-239389 A | 10/2009 |

OTHER PUBLICATIONS

Okutomi et al., A Locally Adaptive Window for Signal Matching. Proceedings of the Third International Conference on Computer Vision (ICCV '90), Dec. 1990, pp. 190-199.

* cited by examiner

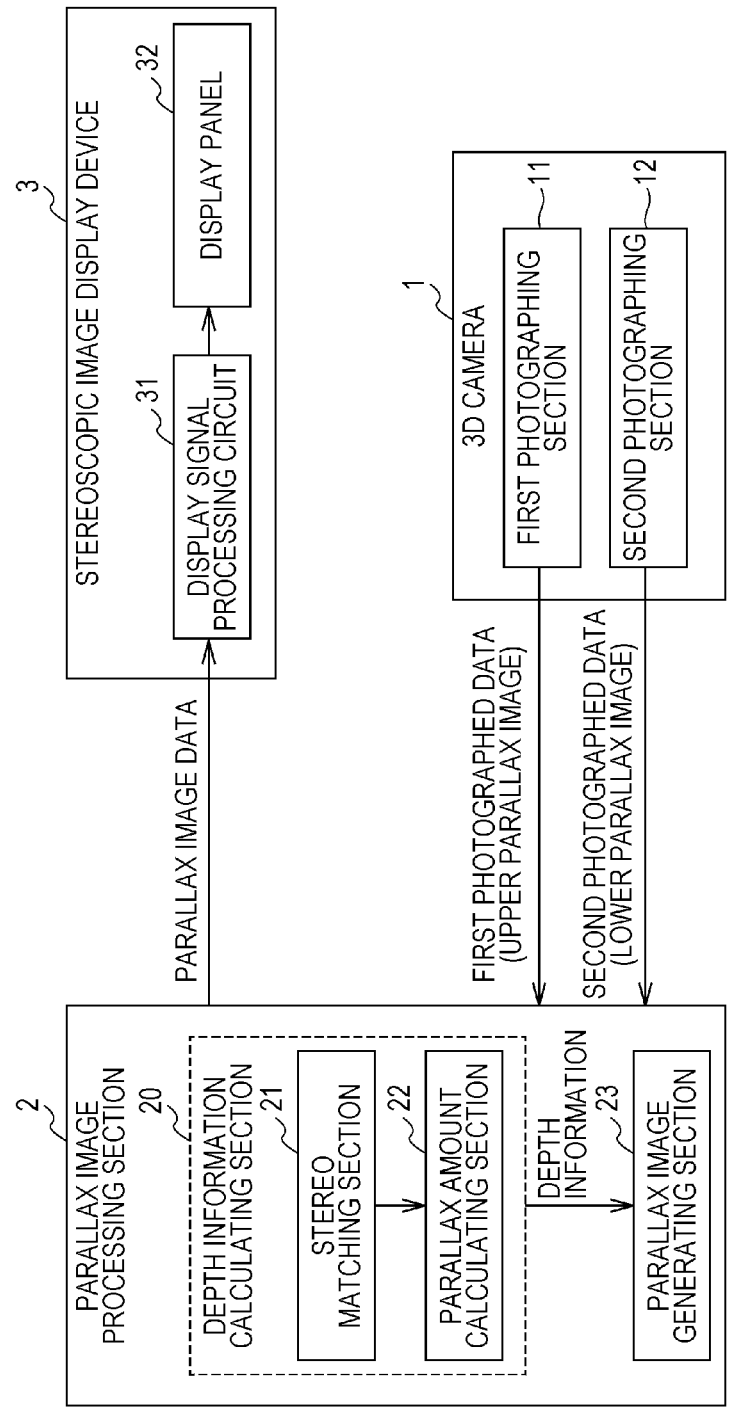

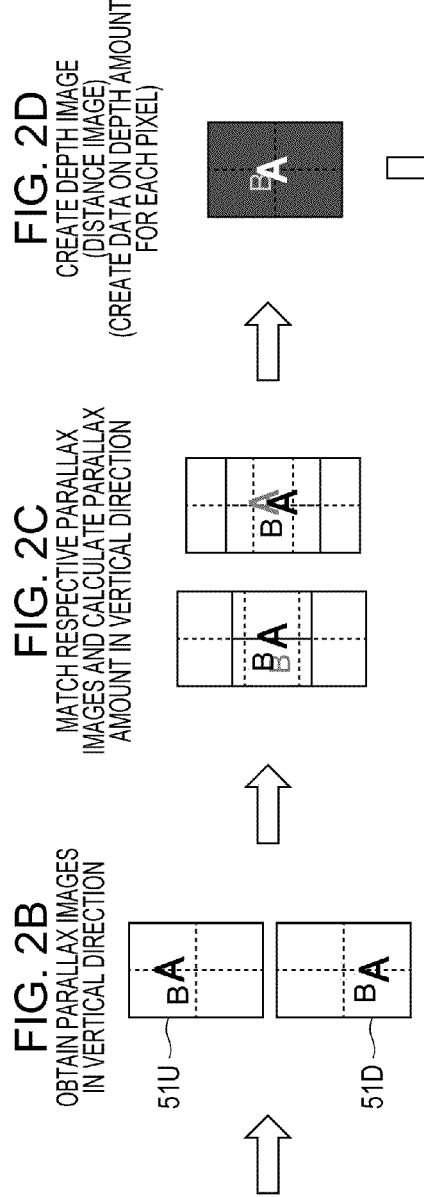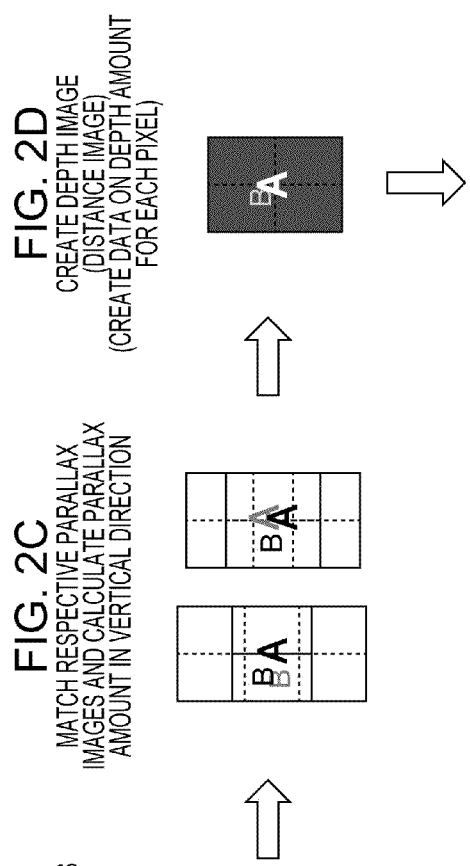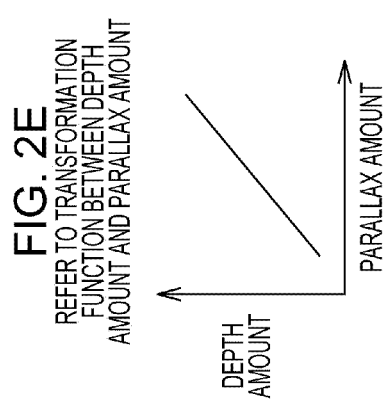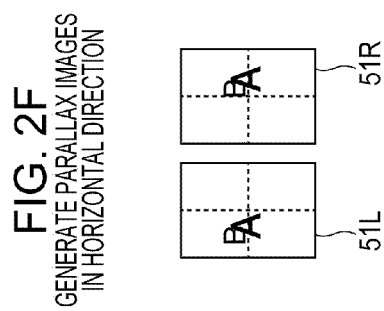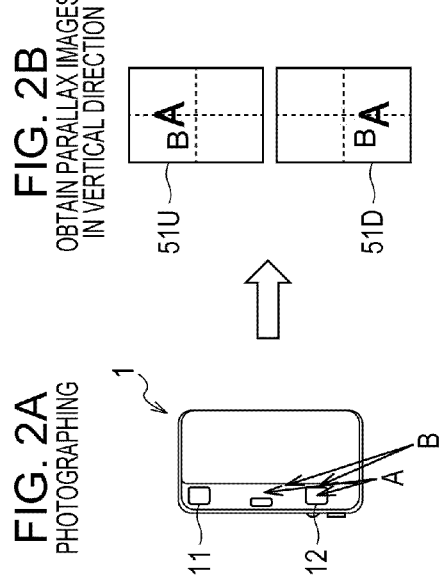

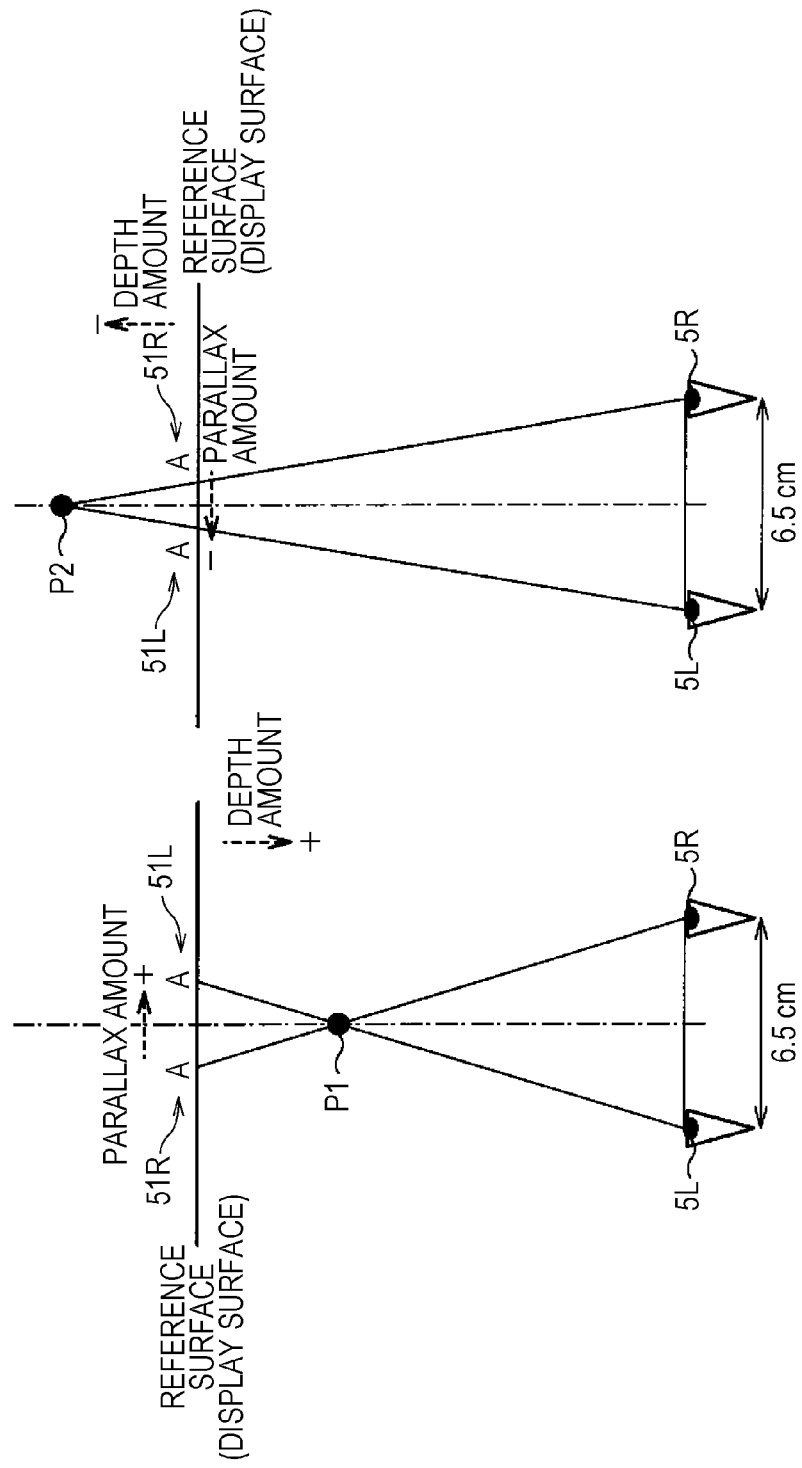

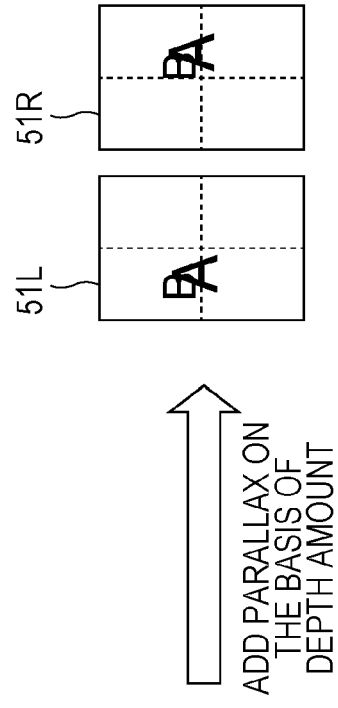
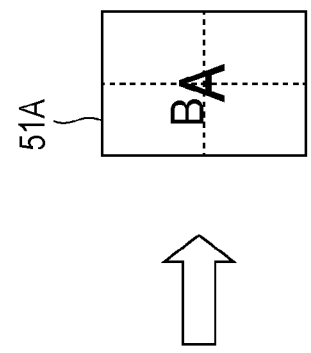
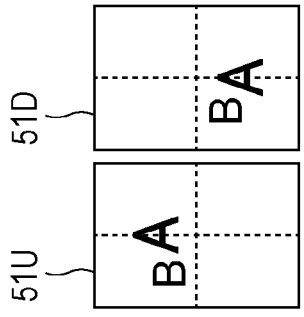

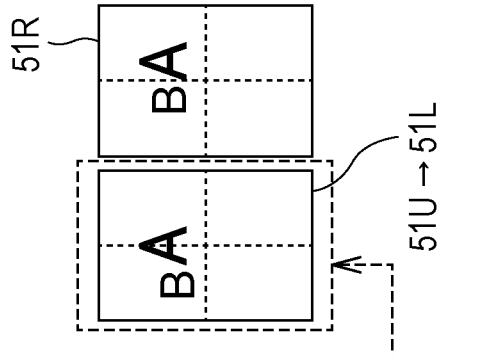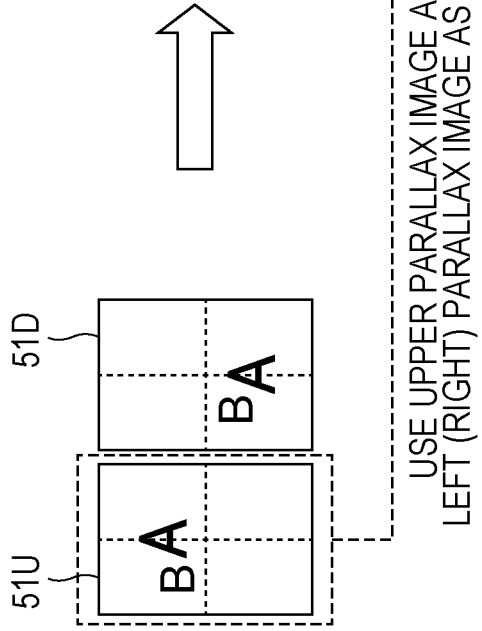

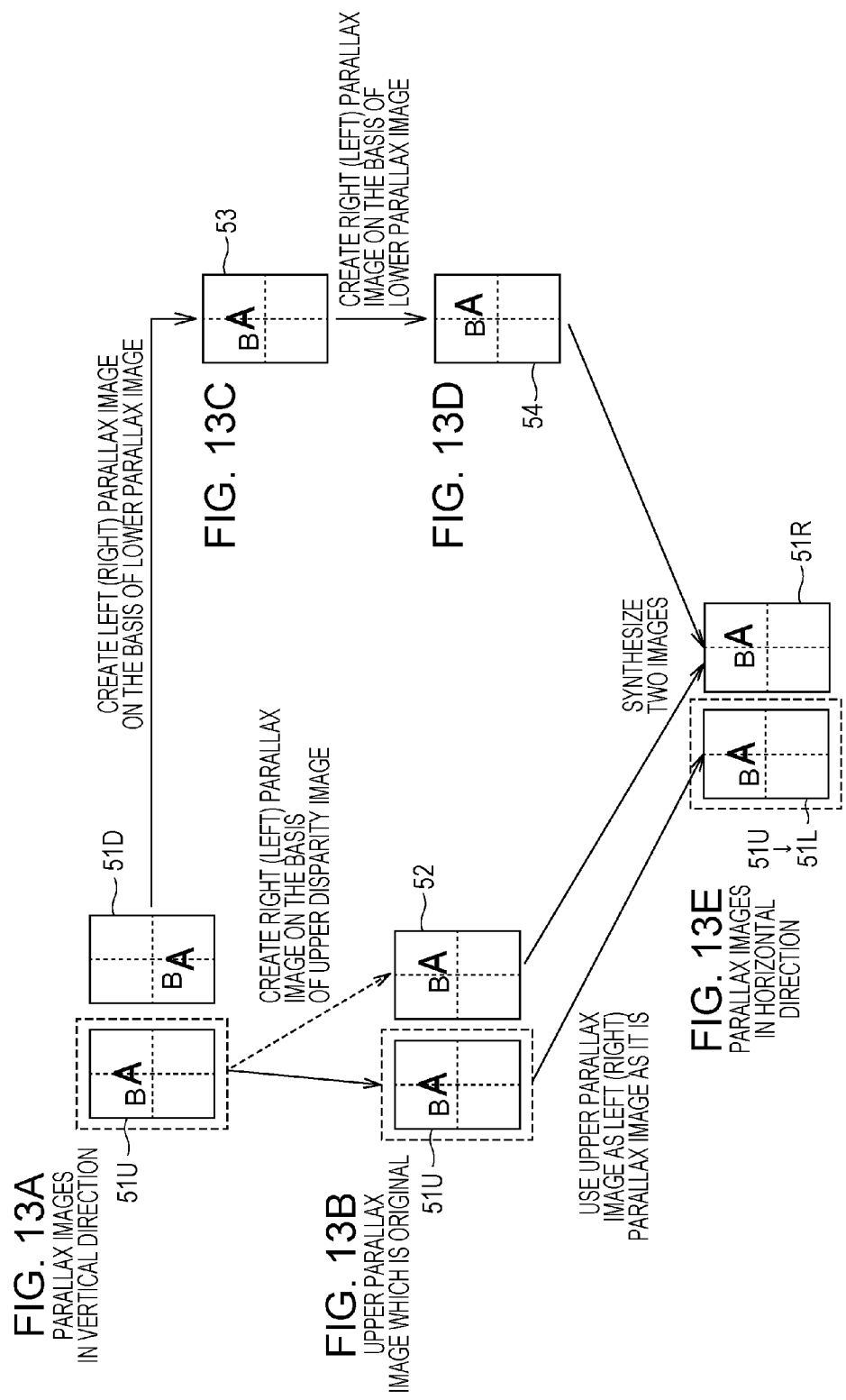

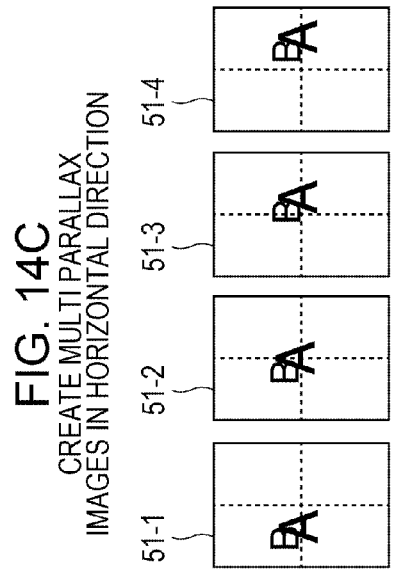
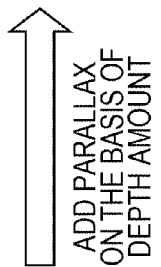
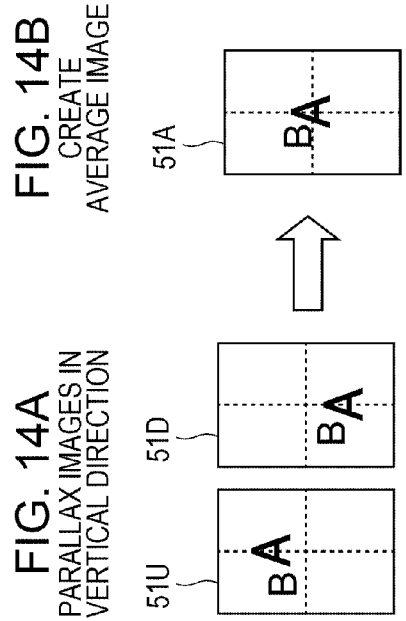
FIG. 14A PARALLAX IMAGES IN VERTICAL DIRECTION
FIG. 14B CREATE AVERAGE IMAGE
FIG. 14C CREATE MULTI PARALLAX IMAGES IN HORIZONTAL DIRECTION
ADD PARALLAX ON THE BASIS OF DEPTH AMOUNT

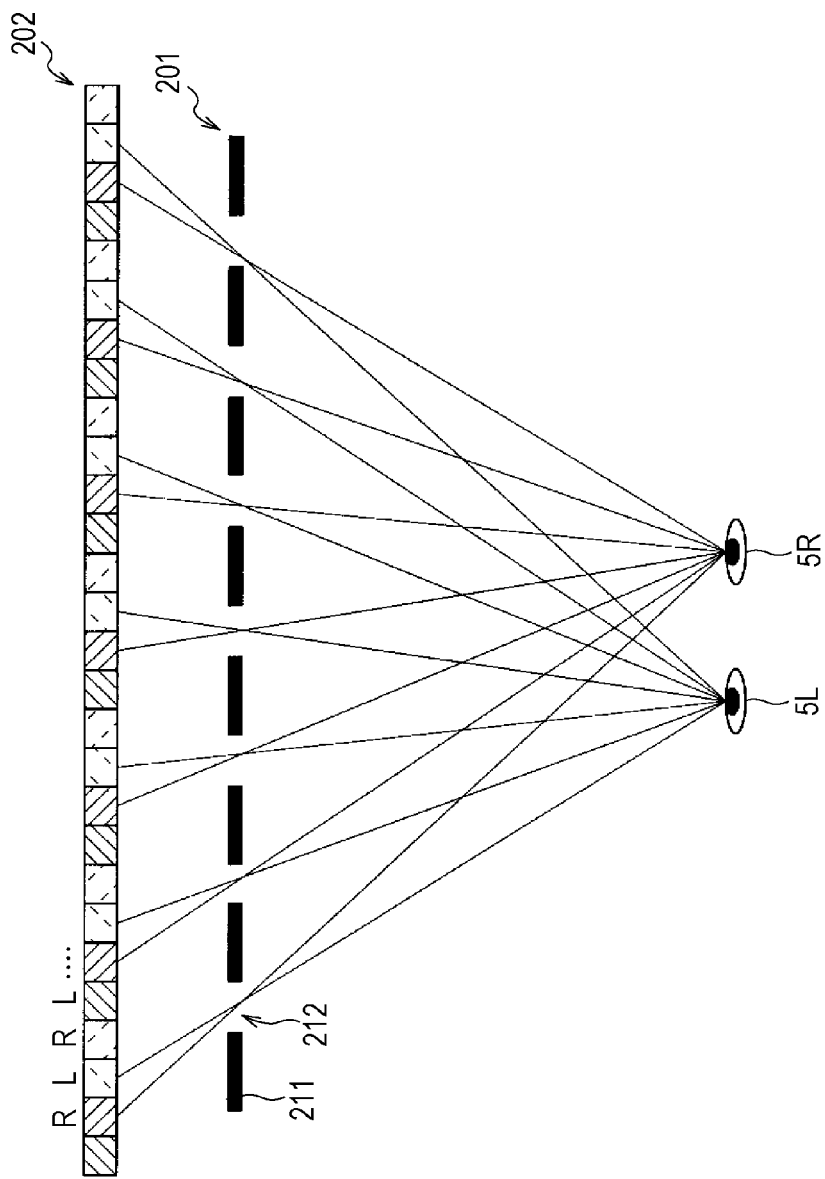

IMAGE PROCESSING DEVICE AND METHOD, AND STEREOSCOPIC IMAGE DISPLAY DEVICE

BACKGROUND

The present disclosure relates to an image processing device which generates a plurality of parallax images for stereoscopic display and an image processing method, and a stereoscopic image display device which performs stereoscopic display on the basis of a plurality of parallax images.

Recently, as shown in FIG. 15, a 3D camera 101 in which a first photographing section 111 and a second photographing section 112 are arranged in a horizontal direction has been put into production. By photographing using the 3D camera 101, a left parallax image 151L and a right parallax image 151R having parallax in the horizontal direction may be obtained. On the basis of the parallax images 151L and 151R in the horizontal direction, it is possible to display a stereoscopic image by a stereoscopic image display device.

In order to perform the stereoscopic display by the stereoscopic image display device, there are proposed a glasses type in which an observer uses glasses, and a glasses-free type in which the observer can stereoscopically view an object with naked eyes without wearing glasses. As a representative example of the glasses type, there is a shutter glasses type in which shutter glasses having a left eye shutter and a right eye shutter are used. In the shutter glasses type, a left eye parallax image and a right eye parallax image are alternately displayed on a 2D display panel at high speed in a frame sequential manner. Further, as the left eye shutter and the right eye shutter are alternately switched according to a display timing of each parallax image, only the left parallax image is incident to the left eye of the observer, and only the right parallax image is incident to the right eye of the observer, to thereby obtain stereopsis.

On the other hand, as representative examples of the glasses-free type, there are a parallax barrier type and a lenticular lens type. In the case of the parallax barrier type or the lenticular type, parallax images for stereopsis (right eye parallax image and left eye parallax image in the case of 2 viewpoints) are space-divided and displayed on a 2D display panel, the parallax images are parallax-divided in a horizontal direction by a parallax dividing section, and thus, the stereopsis is performed. In the case of the parallax barrier type, a parallax barrier which is formed with a slit opening which is the parallax dividing section is used. In the case of the lenticular type, a lenticular lens in which a plurality of cylindrical split lenses is arranged in parallel is used as the parallax dividing section.

FIG. 17 illustrates an example of a general configuration of the stereoscopic image display device according to the parallax barrier type. The stereoscopic image display device has a configuration in which a parallax barrier 201 faces a front surface of a 2D display panel 202. According to the general structure of the parallax barrier 201, a shielding section 211 which shields a display image light from the 2D display panel 202 and a striped opening section (slit section) 212 which transmits the display image light, are alternately disposed in a horizontal direction. A synthesized image in which a right eye parallax image R and a left eye parallax image L are alternately arranged in the horizontal direction is displayed on the 2D display panel 202. In the case of the parallax barrier type, the synthesized image displayed on the 2D display panel 202 is observed through the parallax barrier 201. Thus, in a case where the observer views the stereoscopic image display device from a predetermined location and a predetermined direction, it is possible to separately input a different parallax image light to the left eye 5L and the right eye 5R of the observer through the slit section 212. In this way, in the case where the observer views the stereoscopic image display device from the predetermined location and direction, a stereoscopic image is perceived. In order to realize the stereopsis, it is necessary to show different parallax images to the left eye 5L and the right eye 5R. Thus, at least two parallax images of the right eye image and the left eye image are necessary. In a case where three or more parallax images are used, multiple visions can be realized.

SUMMARY

In the above-described various stereoscopic image display devices, it is necessary to use at least parallax images having parallax in a horizontal direction to perform stereoscopic display normally. As shown in FIG. 15, in a case where the photographing is performed in a state where the first photographing section 111 and the second photographing section 112 are arranged in the horizontal direction by the 3D camera 101, since a left parallax image 151L and a right parallax image 151R which have parallax in the horizontal direction are obtained, it is possible to use them as image data for stereoscopic display as they are. However, for example, as shown in FIG. 16, in a case where the photographing is performed in a state where the first photographing section 111 and the second photographing section 112 are arranged in a vertical direction while setting the 3D camera 101 in a vertical direction, an upper parallax image 151U and a lower parallax image 151D which have parallax only in the vertical direction are obtained. In such images having parallax only in the vertical direction, stereoscopic display is not performed normally in the stereoscopic image display device.

Japanese Unexamined Patent Application Publication No. 2009-239389 discloses a technique are generated in which interpolation images having different parallax from a plurality of parallax images so as to change a sense of depth of a stereoscopic image. In the technique disclosed in Japanese Unexamined Patent Application Publication No. 2009-239389, it is possible to change a parallax amount. However, the direction of parallax of the generated interpolation images is the same as that of the original parallax images. Thus, in a case where the original parallax images are the upper parallax image 151U and the lower parallax image 151D having parallax only in the vertical direction, obtained as shown in FIG. 16, it is difficult to perform stereoscopic display normally.

It is desirable to provide an image processing device, an image processing method, and a stereoscopic image display device capable of obtaining parallax images having parallax in a desired direction, even in a case where obtained parallax images have parallax in a direction different from the desired direction.

Some embodiments relate to a method of forming images. The method includes producing a depth image based on a first image of a scene from a first viewpoint and a second image of the scene from a second viewpoint. The first and second viewpoints are displaced along a first dimension. The method also includes producing, based on the depth image, a third image and a fourth image corresponding to third and fourth viewpoints, respectively. The third and fourth viewpoints are displaced along a second dimension different from the first dimension.

Some embodiments relate to a computer readable storage medium, such as a non-transitory, computer readable storage medium, having stored thereon instructions, which, when executed, perform a method of forming images. The method includes producing a depth image based on a first image of a scene from a first viewpoint and a second image of the scene from a second viewpoint. The first and second viewpoints are displaced along a first dimension. The method also includes producing a third image and a fourth image based on the depth image. The third and fourth images correspond to third and fourth viewpoints displaced along a second dimension different from the first dimension.

Some embodiments relate to an image processing system. The image processing system includes a depth information calculating unit configured to produce a depth image based on a first image of a scene from a first viewpoint and a second image of the scene from a second viewpoint. The first and second viewpoints are displaced along a first dimension. The image processing system also includes a parallax image generating unit configured to produce a third image and a fourth image based on the depth image, the third and fourth images corresponding to third and fourth viewpoints displaced along a second dimension different from the first dimension.

According to the image processing device, the image processing method, or the stereoscopic image display device in the disclosure, since the depth amount of the stereoscopic display is calculated on the basis of the plurality of first parallax images having parallax in the first direction, and the plurality of second parallax images having parallax in the second direction which is different from the first direction is generated on the basis of the depth amount, for example, even in the case of the parallax images captured by the 3D camera in a direction (vertical direction, for example) which is different from a desired direction (horizontal direction, for example), it is possible to transform them into the parallax images having parallax in the desired direction. Thus, it is possible to obtain the parallax images suitable for stereoscopic display.

BRIEF DESCRIPTION OF THE DRAWINGS

FIG. 1 is a block diagram illustrating an example of a configuration of a parallax image processing device and a stereoscopic image display device according to a first embodiment of the disclosure;

FIGS. 2A to 2F are explanatory diagrams illustrating the outline of a parallax image generating process in the parallax image processing device in FIG. 1;

FIGS. 3A and 3B are explanatory diagrams illustrating the relationship between a parallax amount and a depth amount;

FIGS. 11A to 11C are explanatory diagrams illustrating a first example of a generating method of parallax images in a parallax image generating section of the parallax image processing device in FIG. 1;

FIGS. 12A and 12B are explanatory diagrams illustrating a second example of a generating method of parallax images in a parallax image generating section of the parallax image processing device in FIG. 1;

FIGS. 13A to 13E are explanatory diagrams illustrating a third example of a generating method of parallax images in a parallax image generating section of the parallax image processing device in FIG. 1;

FIGS. 14A to 14C are explanatory diagrams illustrating a fourth example of a generating method of parallax images in a parallax image generating section of the parallax image processing device in FIG. 1;

FIG. 17 is a cross-sectional diagram illustrating a stereoscopic image display device according to a parallax barrier type.

DETAILED DESCRIPTION OF EMBODIMENTS

Figure 4:
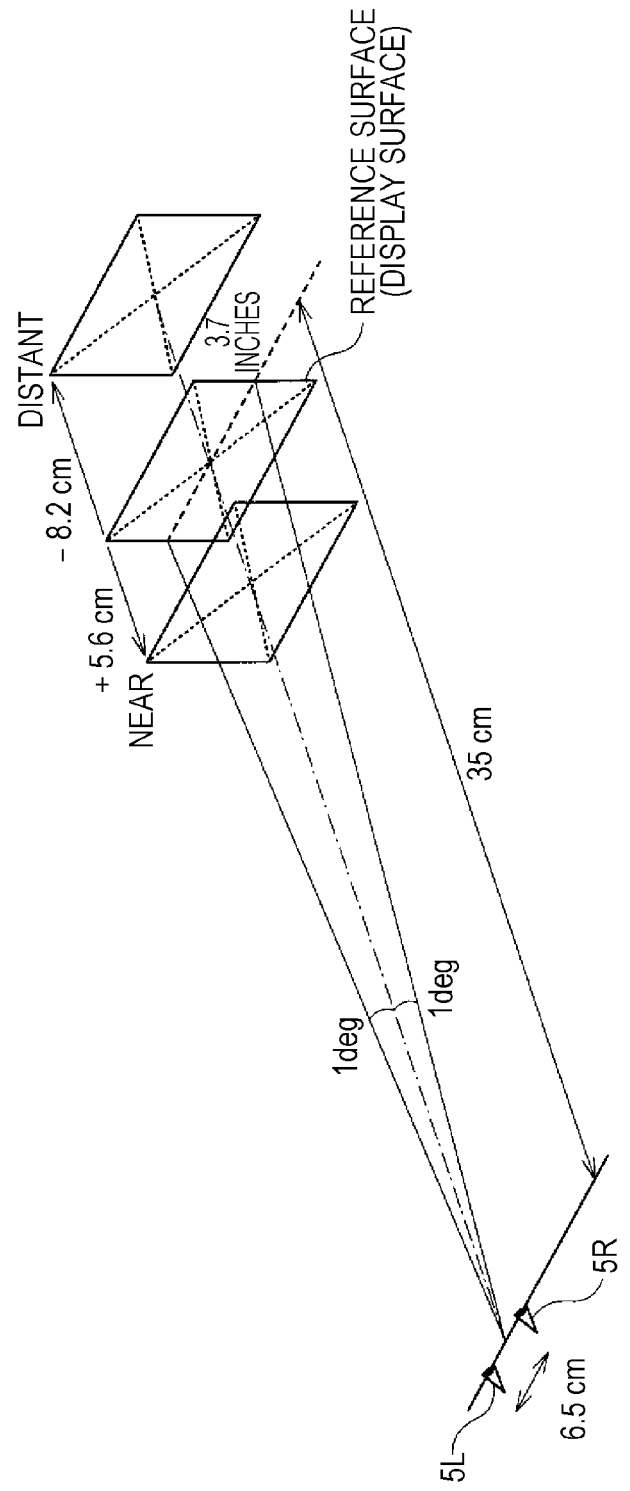
FIG. 4 is an explanatory diagram illustrating the depth amount in a case where the size of a display surface is 3.7 inches.

Hereinafter, embodiments of the disclosure will be described with reference to the accompanying drawings.

Configuration Example

FIG. 1 illustrates an example of a configuration of a parallax image processing device 2 and a stereoscopic image display device 3 according to an embodiment of the disclosure. FIGS. 2A to 2F illustrate the outline of a parallax image generating process in the parallax image processing device 2 in FIG. 1. Firstly, configurations of the parallax image processing device 2 and the stereoscopic image display device 3 will mainly be described with reference to FIG. 1. In FIG. 1, the parallax image processing device 2 and the stereoscopic image display device 3 may have different configurations, but functions of the parallax image processing device 2 may be included in the stereoscopic image display device 3.

The stereoscopic image display device 3 displays a stereoscopic image on the basis of parallax image data (left parallax image 51L and right parallax image 51R in FIG. 2F) output from the parallax image processing device 2, and includes a display signal processing circuit 31 and a display panel 32. A stereoscopic display method of the stereoscopic image display device 3 is not particularly limited. A glasses type such as a shutter glasses type may be used, or a glasses-free type such as a parallax barrier type or a lenticular lens type may be used. The display signal processing circuit 31 generates an image according to the stereoscopic display method of the stereoscopic image display device 3 on the basis of the parallax image data output from the parallax image processing device 2, and displays it on the display panel 32. The display panel 32 includes a 2D display such as a liquid crystal display panel, a display panel of an electric luminance type or a plasma display. A plurality of pixels is arranged in a 2D manner on a display screen of the display panel 32. On the display screen of the display panel 32, an image display is performed according to the stereoscopic display method of the stereoscopic image display device 3.

In the parallax image processing device 2, a first imaged data from a first photographing section 11 and a second imaged data from a second photographing section 12, which are captured by a 3D camera 1 having the first photographing section 11 and the second photographing section 12 which are disposed in different locations, are input as a plurality of pieces of first parallax image data. In this embodiment, an upper parallax image 51U and a lower parallax image 51D having a vertical parallax, which are captured by the first photographing section 11 and the second photographing section 12 in a state of being disposed in a vertical direction, are input to the parallax image processing device 2 as the first imaged data and the second imaged data, by setting the 3D camera 1 in a vertical direction as shown in FIG. 2A, for example.

The parallax image processing device 2 includes a depth information calculating section 20 and a parallax image generating section 23. The depth information calculating section 20 includes a stereo matching section 21 and a parallax amount calculating section 22. Functions of the respective sections may include a combination of a CPU (arithmetic processing unit), a recording medium in which a program for arithmetic processing is recorded, a memory for arithmetic processing, a data storing memory for image data, and the like, for example.

The depth information calculating section 20 calculates the depth amount of a stereoscopic display expressed by a plurality of first parallax images, on the basis of the plurality of first parallax images (upper parallax image 51U and lower parallax image 51D) having parallax in a first direction (vertical direction). The depth information calculating section 20 performs an image matching process for every pixel with respect to the plurality of first parallax images, to calculate a first directional parallax amount for each pixel in an image portion which is common between the plurality of first parallax images, and to calculate the depth amount for each pixel in the common image portion, on the basis of the first directional parallax amount. The stereo matching section 21 performs the image matching process. The parallax amount calculating section 22 calculates the first directional parallax amount on the basis of the image data after the image matching process, and calculates the depth amount.

Figure 5:
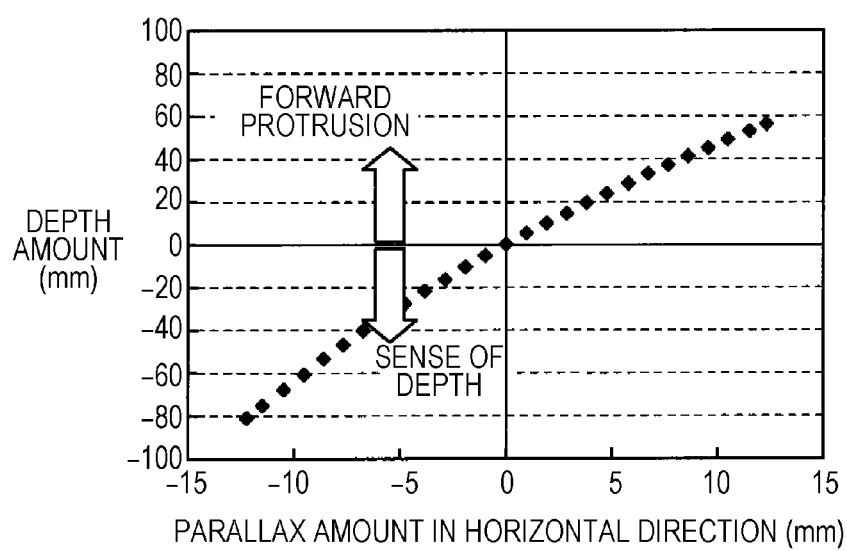
FIG. 5 is an explanatory diagram illustrating an example of a transformation function between a parallax amount and a depth amount in a case where the size of the display surface is 3.7 inches.
Figure 7:
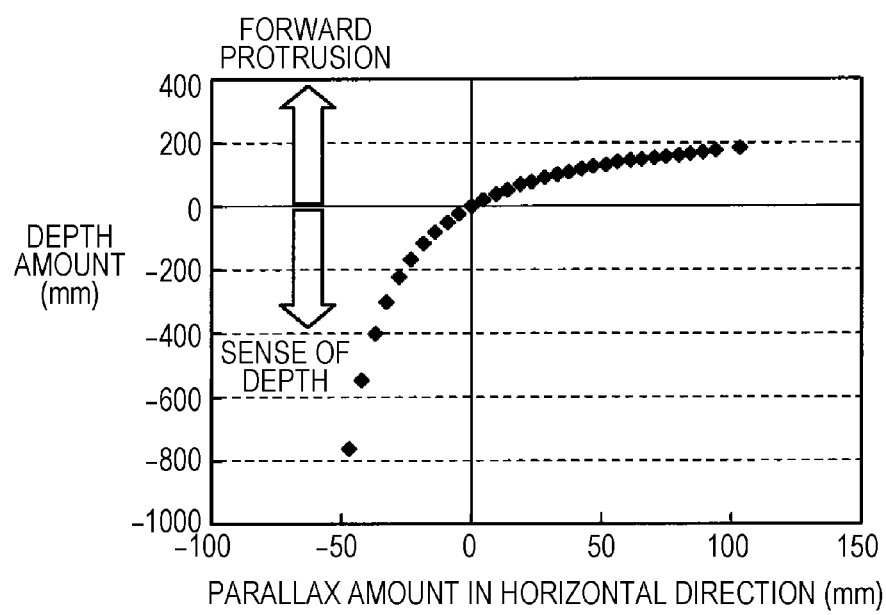
FIG. 7 is an explanatory diagram illustrating an example of a transformation function between a parallax amount and a depth amount in a case where the size of the display surface is 40 inches.

The parallax image generating section 23 generates a plurality of second parallax images (left parallax image 51L and right parallax image 51R) having parallax in a second direction (horizontal direction) which is different from the first direction, on the basis of the depth amount calculated by the depth information calculating section 20. The parallax image generating section 23 calculates the parallax amount in the second direction from the depth amount, on the basis of a predetermined transformation function as shown in FIG. 5 or FIG. 7 indicating the relationship between the parallax amount and the depth amount in a stereopsis, to generate the plurality of second parallax images.

[Outline of a Parallax Image Generating Process]

The outline of the parallax image generating process in the parallax image processing device 2 will be described with reference to FIGS. 2A to 2F. The upper parallax image 51U and the lower parallax image 51D having vertical parallax in the vertical direction, which are obtained by photographing using the 3D camera 1 set in the vertical direction as shown in FIG. 2A, for example, are input to the parallax image processing device 2, as the plurality of pieces of first parallax image data (refer to FIG. 2B). In the parallax image processing device 2, the depth information calculating section 20 performs the image matching process for every pixel with respect to the upper parallax image 51U and the lower parallax image 51D, to calculate the vertical parallax amount for each pixel in the image portion which is common between the upper parallax image 51U and the lower parallax image 51D (refer to FIG. 2C). Then, the depth information calculating section 20 calculates the depth amount for each pixel in the common image portion, on the basis of the vertical parallax amount (refer to FIG. 2D). As a technique of the image matching process, for example, "The stereo matching method by an adaptive window" (Institute of Electronics, Information and Communication Engineers (IEICE), D-II, Vol. J74-D-II No. 6, pp. 669-677 (1991)) may be used. Further, when the depth amount is calculated, for example, a depth image (distance image) may be created to preserve data on the depth amount in the form of image data. The depth image may be created on the basis of the distance to an object and the vertical parallax amount calculated by the depth information calculating section 20, in a case where information on the distance measured by the 3D camera 1 is present, when the object is photographed by the 3D camera 1, for example. The distance to the object may be determined from a point which is in focus in the image (portion having the highest contrast).

The parallax image generating section 23 generates the plurality of the second parallax images (left parallax image 51L and right parallax image 51R) having parallax in the second direction (horizontal direction) on the basis of the depth amount calculated by the depth information calculating section 20 (refer to FIGS. 2E and 2F). At this time, the parallax image generating section 23 calculates the horizontal parallax amount from the depth amount, on the basis of the predetermined transformation function as shown in FIG. 5 or FIG. 7 indicating the relationship between the parallax amount and the depth amount in the stereopsis. As the generated left parallax image 51L and right parallax image 51R are output to the stereoscopic image display device 3, the stereoscopic image display device 3 may perform a normal stereoscopic image display on the basis of the parallax image data.

[Relationship Between Parallax Amount and Depth Amount]

FIGS. 3A and 3B illustrate the relationship between the parallax amount and the depth amount. In FIGS. 3A and 3B, the relationship between the display location and the stereopsis of the stereoscopic parallax images (left parallax image 51L and right parallax image 51R) are schematically illustrated. Vision (stereoscopic effect or sense of depth) of a stereoscopic image varies according to differences in the parallax amount. If the left parallax image 51L and the right parallax image 51R are disposed in the same pixel location on a reference surface (image display surface in the display panel 32) and the parallax amount is zero, the same pixel location on the image display surface is observed by a left eye 5L and a right eye 5R of an observer, which is substantially the same as the 2D image. In this case, the displayed image does not have parallax, and the observer views a real image. On the other hand, FIGS. 3A and 3B illustrate a case where the left parallax image 51L and the right parallax image 51R are displayed with parallax.

In FIG. 3A, the right parallax image 51R is disposed on the left side with reference to the left parallax image 51L on the reference surface (image display surface). In such a case, for example, the parallax amount of the left parallax image 51L may be defined to be in the plus (+) direction with respect to the right parallax image 51R. In the case of FIG. 3A, the observer stereoscopically views a virtual image P1 which is near the image display surface. In this case, the stereoscopic effect which looks as if the image is being protruded to the front side is obtained. The depth amount in a state where it look as if the image is protruded to the front may be determined as the plus (+) direction, for example. In this case, the larger an absolute value of the depth amount in the plus (+) direction, the greater the stereoscopic effect which looks as if the image is being protruded more to the front is obtained.

On the other hand, in FIG. 3B, display locations of the left and right images are reversed to the case in FIG. 3A. That is, in FIG. 3B, the right parallax image 51R is disposed on the left side with reference to the left parallax image 51L on the image display surface. In such a case, for example, the parallax amount of the left parallax image 51L may be defined to be in the minus (−) direction with respect to the right parallax image 51R. In the case of FIG. 3B, the observer stereoscopically views a virtual image P2 which is distant in depth from the image display surface. In this case, the stereoscopic effect having a sense of depth with respect to the reference surface is obtained. The depth amount in a state where the sense of depth is present may be determined as the minus (−) direction, for example. In this case, as an absolute value of the depth amount in the minus (−) direction becomes large, the stereoscopic effect having the sense of depth is obtained.

Further, the relationship between the parallax amount and the depth amount depends on the size and viewing distance of the display. FIG. 4 illustrates a specific example of the depth amount in a case where the size of the display surface is 3.7 inches. Further, FIG. 5 illustrates an example of the transformation function between the parallax amount in the horizontal direction and the depth amount in a case where it is a viewing distance as shown in FIG. 4. In FIGS. 4 and 5, the distance from the center location of the eyes 5L and 5R of the observer to the reference surface (display surface) is set to 35 cm. An interval (inter-eye distance) between the left eye 5L and the right eye 5R of the observer is set to 6.5 cm.

Figure 6:
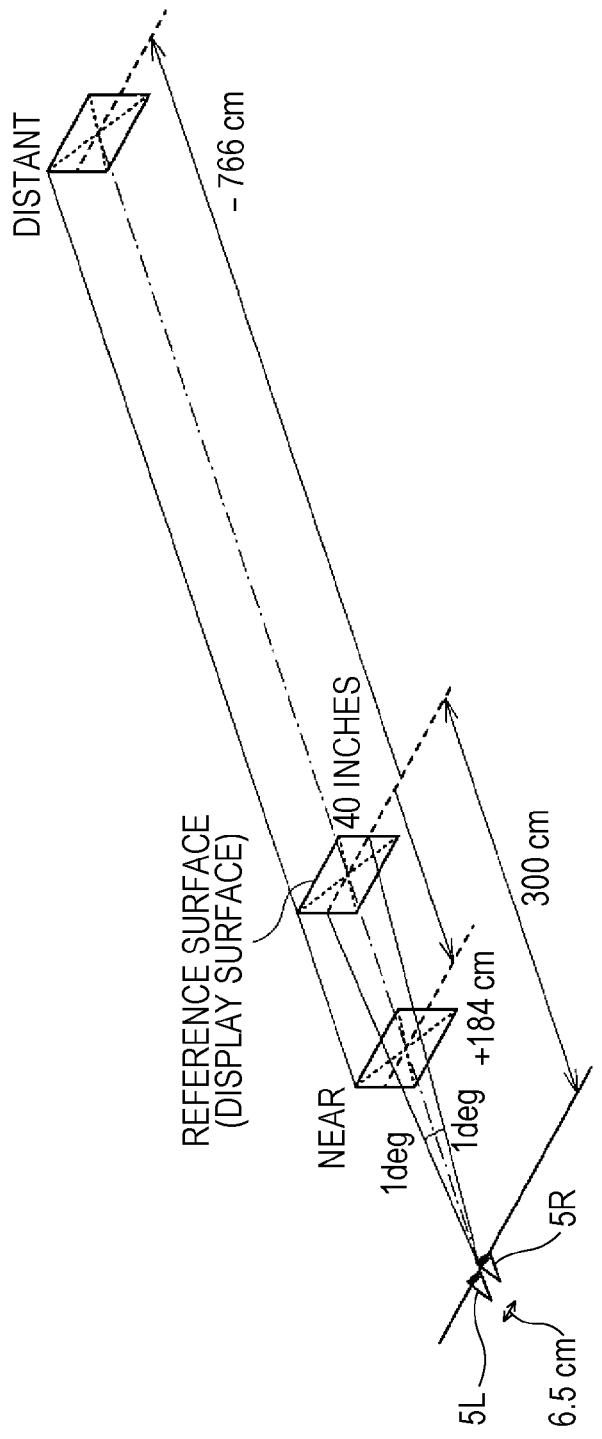
FIG. 6 is an explanatory diagram illustrating a depth amount in a case where the size of the display surface is 40 inches.

FIG. 6 illustrates a specific example of the depth amount in a case where the size of the display surface is 40 inches. Further, FIG. 7 illustrates an example of the transformation function between the parallax amount in the horizontal direction and the depth amount in a case where it is a viewing distance as shown in FIG. 6. In FIGS. 6 and 7, the distance from the center location of the eyes 5L and 5R of the observer to the reference surface (display surface) is set to 300 cm. An interval (eye-spacing width) between the left eye 5L and the right eye 5R of the observer is set to 6.5 cm.
(Weighting)

The parallax image generating section 23 may calculate the parallax amount in the horizontal direction from the depth amount on the basis of the predetermined transformation function as shown in FIGS. 5 to 7. However, the parallax image generating section 23 may change the relationship between the parallax amount and the depth amount expressed by the predetermined transformation function by a predetermined weighting function, to calculate the parallax amount in the horizontal direction on the basis of the transformation function after the change. Thus, when the parallax images 51L and 51R in the horizontal direction are generated, it is possible to adjust the stereoscopic effect to be suitable for the size of the display panel 32 of the stereoscopic image display device 3 or to viewer's preferences. For example, it is possible to assign strength and weakness to the forward protrusion amount or the sense of depth in the case of the stereoscopic display according to the viewer's preferences. It is possible to give the following weights to the relationships (the predetermined transformation functions shown in FIGS. 5 to 7) between the parallax amount and the depth amount which become the reference, for example. This weighting of 1 to 5 is only an example of the functions, and other functions may be applied.
1. Linear transformation
2. Parallel transformation
3. Transformation in which the protrusion side (forward side) is emphasized
4. Transformation in which the depth side is emphasized
5. Combination of 1 to 4

Figure 8:
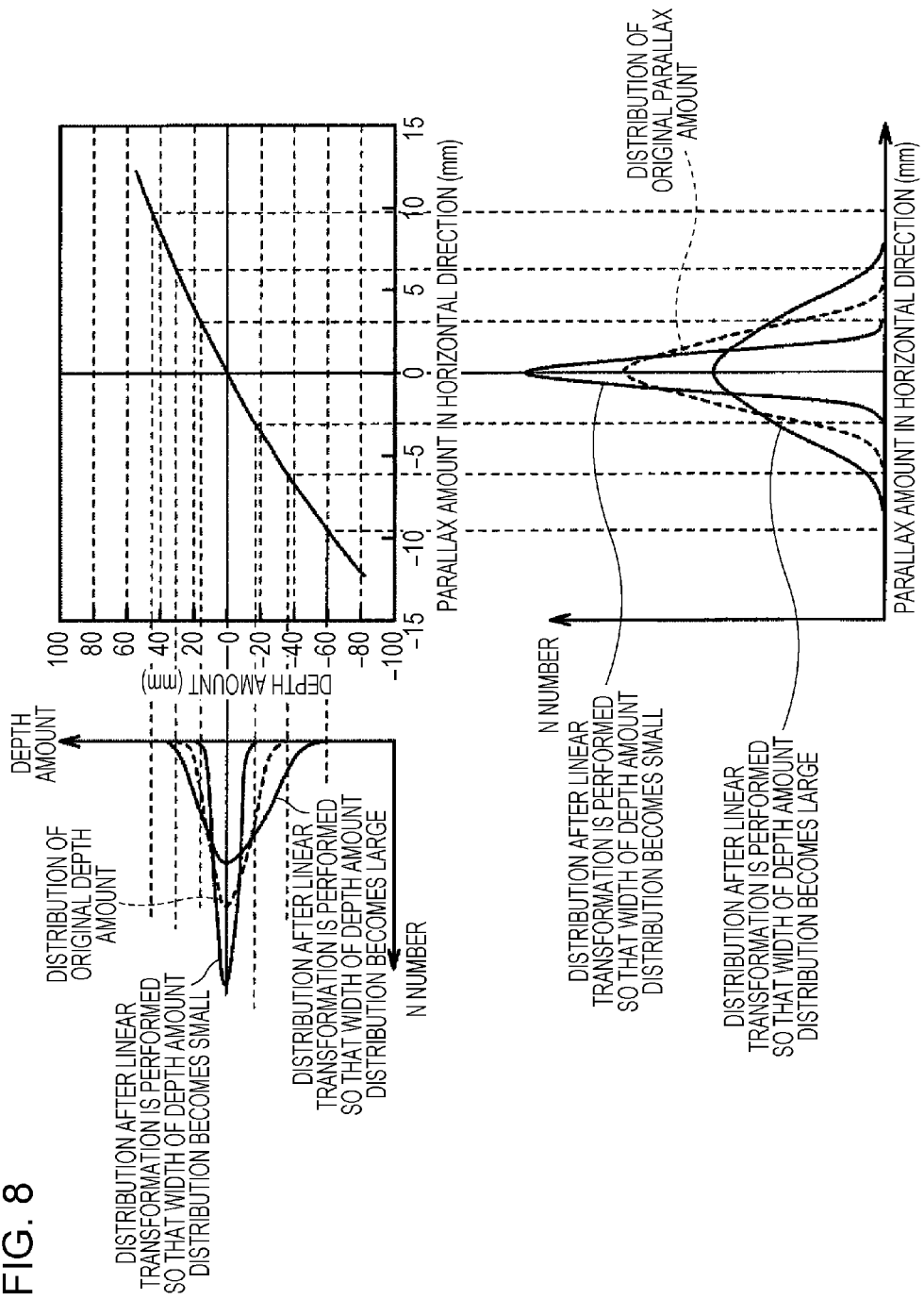
FIG. 8 is an explanatory diagram illustrating an example in which the relationship between the parallax amount and the depth amount expressed by the transformation function in FIG. 5 is linearly transformed by a predetermined weighting function.

FIG. 8 illustrates an example in which the relationship between the parallax amount and the depth amount expressed by the transformation function in FIG. 5 is linearly transformed by a predetermined weighting function. In the graph of the depth amount distribution and the parallax amount distribution in FIG. 8, the N number in the longitudinal axis represents the number of pixels of each parallax image. In FIG. 8, an example is shown in which the spreading width of the distribution (half-value width) is linearly transformed with respect to an original parallax amount distribution without changing the center location. Further, the depth amount distribution corresponding to the parallax amount distribution is illustrated. Specifically, there are shown an example in which the linear transformation is performed so that the spreading width of the distribution becomes small with respect to the original parallax amount distribution and depth amount distribution, and an example in which the linear transformation is performed so that the spreading width becomes large with respect to the original parallax amount distribution and depth amount distribution. In a case where the spreading width becomes small, a stereoscopic image having a low stereoscopic effect (sense of protrusion and sense of depth) compared with the original may be displayed. In a case where the spreading width becomes large, a stereoscopic image having a high stereoscopic effect (sense of protrusion and sense of depth) compared with the original may be displayed.

Figure 9:
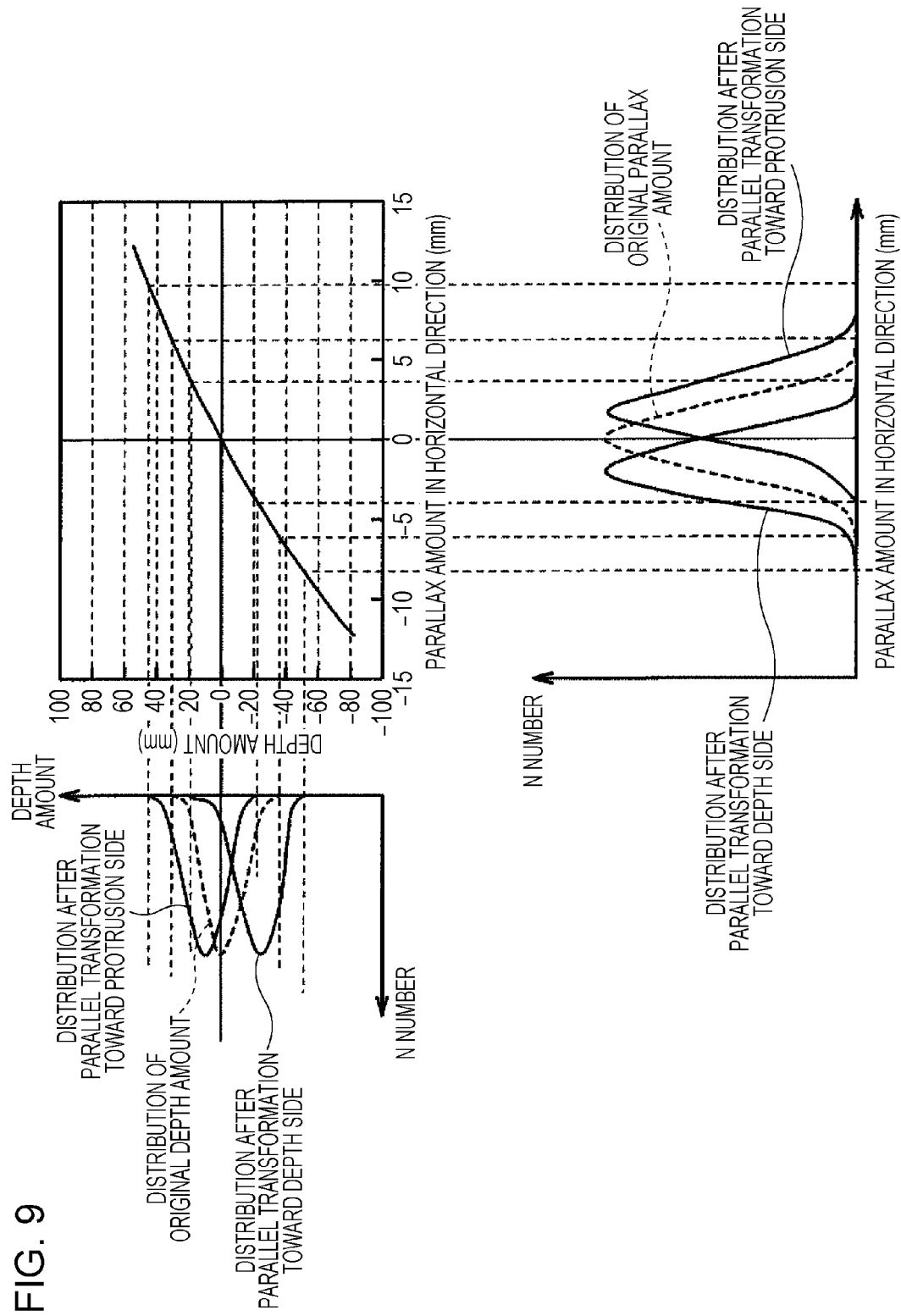
FIG. 9 is an explanatory diagram illustrating an example in which the relationship between the parallax amount and the depth amount expressed by the transformation function in FIG. 5 is transformed in parallel by a predetermined weighting function.

FIG. 9 illustrates an example in which the relationship between the parallax amount and the depth amount expressed by the transformation function in FIG. 5 is transformed in parallel by a predetermined weighting function. In FIG. 9, an example is shown in which overall distribution locations are changed (offset) by the parallel transformation without a change in the overall shape for the original parallax amount distribution. Further, the depth amount distribution corresponding to the parallax amount distribution is shown. Specifically, there are shown an example in which the parallel transformation is performed toward the protrusion side with respect to the original parallax amount distribution and depth amount distribution, and an example in which the parallel transformation is performed toward the depth side with respect to the original parallax amount distribution and depth amount distribution.

Figure 10:
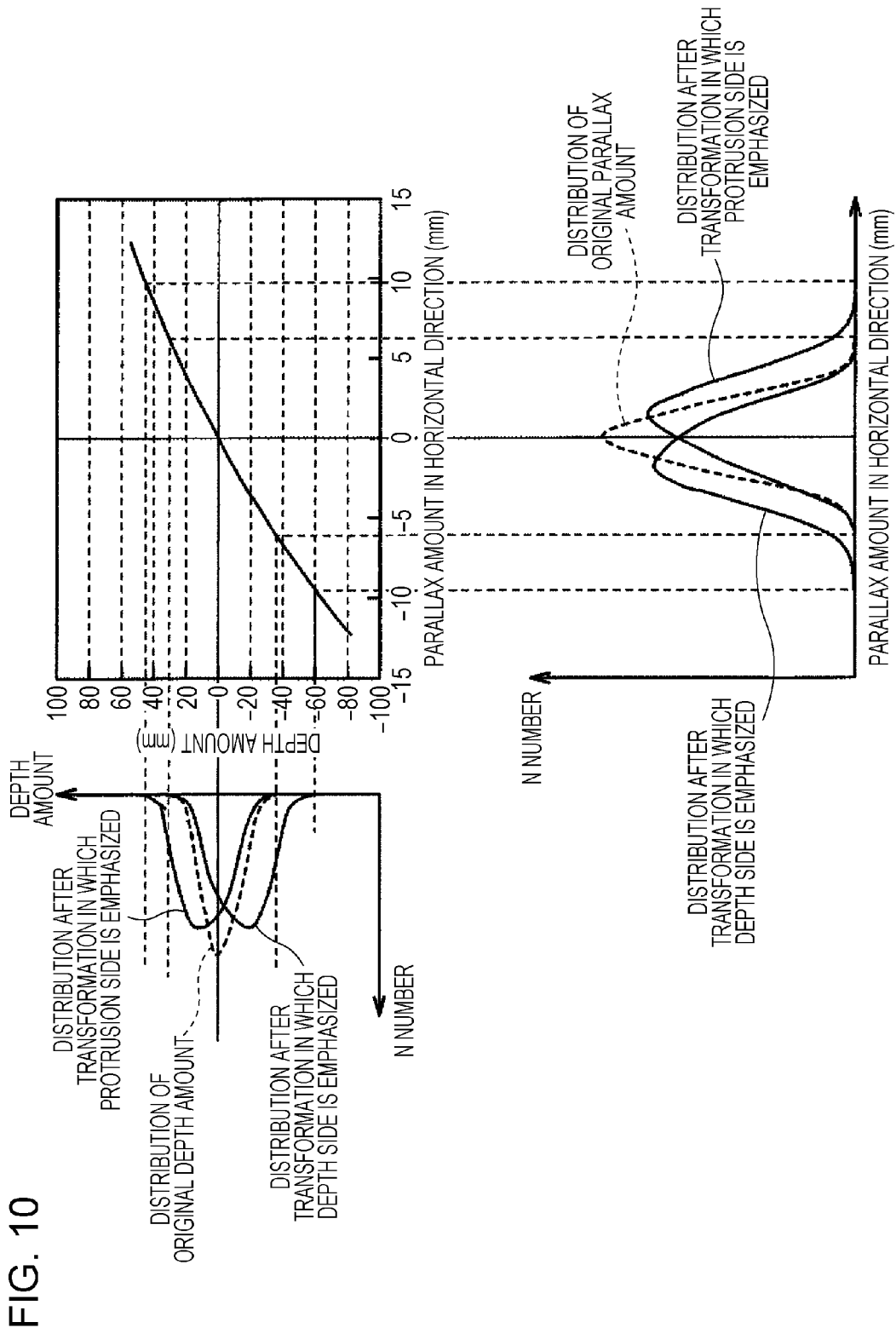
FIG. 10 is an explanatory diagram illustrating an example in which the relationship between the parallax amount and the depth amount expressed by the transformation function in FIG. 5 is transformed to empathize a sense of forward protrusion and an example transformed to emphasize the sense of depth by a predetermined weighting function.
Figure 15:
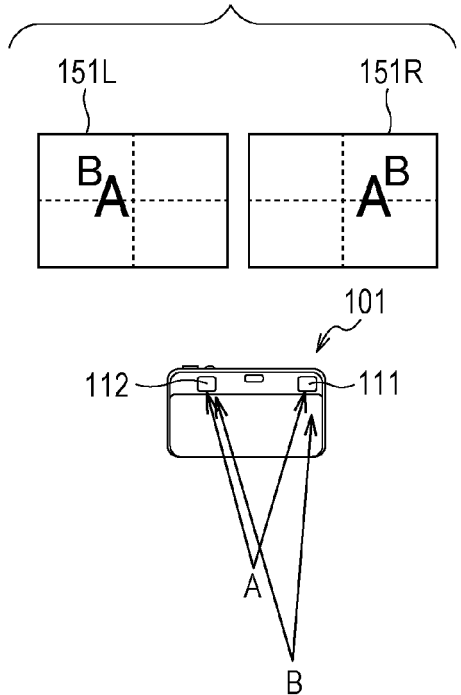
FIG. 15 is an explanatory diagram illustrating a first photographing example in the 3D camera.
Figure 16:
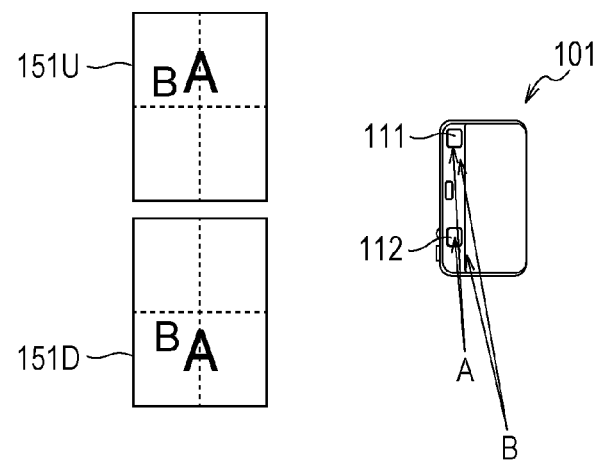
FIG. 16 is an explanatory diagram illustrating a second photographing example in the 3D camera.

FIG. 10 illustrates an example in which the relationship between the parallax amount and the depth amount expressed by the transformation function shown in FIG. 5 is transformed so that the sense of forward protrusion is emphasized, with respect to the original parallax amount distribution and depth amount distribution, by a predetermined weighting function, and an example in which the relationship thereof is transformed so that the sense of depth is emphasized.
[Specific Example of a Parallax Image Generating Method]

FIGS. 11A to 11C illustrate a first example of the parallax image generating method in the parallax image generating section 23. In the first example, the parallax image generating section 23 firstly creates an average image 51A of the plurality of first parallax images (upper parallax image 51U and lower parallax image 51D) (refer to FIGS. 11A and 11B). Then, the parallax image generating section 23 adds parallax in the second direction (horizontal direction) to the average image 51A on the basis of the depth amount calculated by the depth information calculating section 20, to generate the plurality of second parallax images (left parallax image 51L and right parallax image 51R) (refer to FIG. 11C).

FIGS. 12A and 12B illustrate a second example of the parallax image generating method in the parallax image generating section 23. In the second example, firstly, the parallax image generating section 23 uses one specific first parallax image (for example, upper parallax image 51U) in the plurality of first parallax images (upper parallax image 51U and lower parallax image 51D) as one specific second parallax image (for example, left parallax image 51L) in the plurality of second parallax images (left parallax image 51L and right parallax image 51R) as it is. Then, the parallax image generating section 23 adds parallax in the second direction (horizontal direction) to the specific second parallax image on the basis of the depth amount calculated by the depth information calculating section 20, to thereby generate a second parallax image (for example, a right parallax image 51R) other than the specific second parallax image.

An advantage of the first method in FIGS. 11A to 11C is that it is possible to assign the horizontal parallax on the basis of the center location between the first photographing section 11 and the second photographing section 12 in the 3D camera 1, for example, to thereby obtain a stereoscopic image having an angle of view intended by a photographer. A disadvantage is that an image processing amount is increased since the average image 51A is created. An advantage in the second method in FIGS. 12A and 12B is that since the number of the images created in the horizontal direction by the image processing decreases by one, it is possible to reduce the image processing amount. However, a disadvantage is that the stereoscopic image may be created with an angle of view which is different from the intention of the photographer since one vertical parallax image remains as it is.

FIGS. 13A to 13E illustrate a third example of the parallax image generating method in the parallax image generating section 23. In the third example, firstly, the parallax image generating section 23 uses one specific first parallax image (for example, upper parallax image 51U) in the plurality of first parallax images (upper parallax image 51U and lower parallax image 51D) as one specific second parallax image (for example, left parallax image 51L) in the plurality of second parallax images (left parallax image 51L and right parallax image 51R) as it is in the original image state (refer to FIGS. 13A, 13B, and 13E).

On the other hand, the parallax image generating section 23 adds parallax in the second direction (horizontal direction) to the specific first parallax image on the basis of the depth amount calculated by the depth information calculating section 20, to thereby generate a second parallax image (for example, right parallax image 52 based on the upper parallax image 51U) other than the specific second parallax image on the basis of the specific first parallax image (refer to FIGS. 13A and 13B). Further, the parallax image generating section 23 adds parallax in the second direction (horizontal direction) to a first parallax image (for example, lower parallax image 51D) other than the specific first parallax image, on the basis of the depth amount calculated by the depth information calculating section 20, to thereby generate a second parallax image (for example, right parallax image 54 based on the lower parallax image 51D) other than the specific second parallax image on the basis of the different first parallax image. In this case, for example, after the left parallax image 53 based on the lower parallax image 51D is generated, the parallax image generating section 23 generates the right parallax image 54 based on the lower parallax image 51D (refer to FIGS. 13C and 13D). An image obtained by synthesizing the other second parallax image (for example, right parallax image 52 based on the upper parallax image 51U) based on the specific first parallax image and the other second parallax image (for example, right parallax image 54 based on the lower parallax image 51D) based on the other first parallax image is used as another final second parallax image (for example, right parallax image 51R) (refer to FIGS. 13B, 13D and 13E).

FIGS. 14A to 14C illustrate a fourth example of the parallax image generating method in the parallax image generating section 23. In FIGS. 11A to 13E, two horizontal parallax images 51L and 51R are generated as the plurality of second parallax images, but three or more second parallax images may be generated. Thus, it is possible to generate multiple-view parallax images. In the example in FIGS. 14A to 14C, three or more second parallax images are generated by a technique using the generating method in FIGS. 11A to 11C. The parallax image generating section 23 firstly creates the average image 51A of the plurality of first parallax images (upper parallax image 51U and lower parallax image 51D) (refer to FIGS. 14A and 14B). Then, the parallax image generating section 23 adds parallax in the second direction (horizontal direction) to the average image 51A on the basis of the depth amount calculated by the depth information calculating section 20, to thereby generate three or more second parallax images (for example, four multiple parallax images 51-1, 51-2, 51-3, and 51-4) (refer to FIG. 14C). Further, three or more second parallax images may be generated by a technique using the generating method in FIGS. 12A to 13E.

[Effects]

According to the image processing device 2 of the present embodiment, since the depth amount of the stereoscopic display is calculated on the basis of the plurality of first parallax images (parallax images 51U and 51D in the vertical direction) having parallax in the first direction (vertical direction) and the plurality of second parallax images (parallax images 51L and 51R in the horizontal direction) having parallax in the second direction (horizontal direction) which is different from the first direction is generated on the basis of the depth amount, for example, even in the case of the parallax images (parallax images 51U and 51D in the vertical direction) obtained by photographing using the 3D camera 1 in a direction (vertical direction) which is different from a desired direction (horizontal direction), it is possible to transform them into the parallax images (parallax images 51L and 51R in the horizontal direction) having parallax in the desired direction. Thus, it is possible to obtain the parallax images 51L and 51R in the horizontal direction suitable for stereoscopic display.

Other Embodiments

The disclosure is not limited to the above-described embodiment, and may have a variety of modifications.

For example, in the above-described embodiment, the case where the parallax images 51L and 51R in the horizontal direction are generated from the parallax images 51U and 51D in the vertical direction is exemplified. However, the disclosure may be widely applied to a case where parallax images in a second direction which is different from a first direction are generated from arbitrary parallax images in the first direction. For example, in a case where photographing is performed in an oblique direction, the parallax images 51L and 51R in the horizontal direction may be generated from the parallax images in the oblique direction. Further, contrary to the above-described embodiment, the disclosure may be applied to a case where the parallax images 51U and 51D in the vertical direction are generated from the parallax images 51L and 51R in the horizontal direction.

The present disclosure contains subject matter related to that disclosed in Japanese Priority Patent Application JP 2010-208181 filed in the Japan Patent Office on Sep. 16, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a recording medium storing computer executable instructions; and
   a processor configured to execute the instructions to perform the following steps:
   calculating a depth amount of a stereoscopic display expressed by a first image and a second image that have parallax in a first direction, based on the first image and the second image; and
   generating a third image and a fourth image that have parallax in a second direction different from the first direction, based on the depth amount,
   wherein the generating includes:
   using the first image in an original image state as the third image,
   adding parallax in the second direction to the first image based on the depth amount to generate a first temporary image based on the first image,
   adding parallax in the second direction to the second image based on the depth amount to generate a second temporary image based on the second image, and
   synthesizing the first temporary image and the second temporary image to generate the fourth image.

2. The image processing device according to claim 1, wherein the generating calculates a parallax amount in the second direction from the depth amount, based on a transformation function indicating a relationship between the parallax amount in the second direction and the depth amount in a stereopsis, to generate the first temporary image and the second temporary image.

3. The image processing device according to claim 2, wherein the generating changes the relationship between the parallax amount in the second direction and the depth amount expressed by the transformation function by using a weighting function, and calculates the parallax amount in the second direction based on the transformation function after changing the relationship.

4. An image processing method comprising:
   calculating a depth amount of a stereoscopic display expressed by a first image and a second image that have parallax in a first direction, based on the first image and the second image; and
   generating a third image and a fourth image that have parallax in a second direction different from the first direction, based on the depth amount,
   wherein the generating includes:
   using the first image in an original image state as the third image,
   adding parallax in the second direction to the first image based on the depth amount to generate a first temporary image based on the first image,
   adding parallax in the second direction to the second image based on the depth amount to generate a second temporary image based on the second image, and
   synthesizing the first temporary image and the second temporary image to generate the fourth image.

5. A stereoscopic image display device comprising:
   a display section displaying a stereoscopic display;
   a recording medium storing computer executable instructions; and
   a processor configured to execute the instructions to perform the following steps:
   calculating a depth amount of a stereoscopic display expressed by a first image and a second image that have parallax in a first direction, based on the first image and the second image; and
   generating a third image and a fourth image that have parallax in a second direction different from the first direction, based on the depth amount,
   wherein the generating includes:
   using the first image in an original image state as the third image,
   adding parallax in the second direction to the first image based on the depth amount to generate a first temporary image based on the first image,
   adding parallax in the second direction to the second image based on the depth amount to generate a second temporary image based on the second image, and
   synthesizing the first temporary image and the second temporary image to generate the fourth image,
   wherein the display section displays a stereoscopic display based on the third image and the fourth image.

* * * * *